United States Patent

Lechner

[11] Patent Number: 6,005,875
[45] Date of Patent: Dec. 21, 1999

[54] PUBLIC COMMUNICATIONS SERVICE WITH MULTIPLE ACCESS USE OF TRUNK LINKS

[75] Inventor: Robert Lechner, Munich, Germany

[73] Assignee: Siemens Aktiengesellschaft, Munich, Germany

[21] Appl. No.: 08/849,760

[22] PCT Filed: Nov. 23, 1995

[86] PCT No.: PCT/EP95/04630

§ 371 Date: Sep. 19, 1997

§ 102(e) Date: Sep. 19, 1997

[87] PCT Pub. No.: WO96/19090

PCT Pub. Date: Jun. 20, 1996

[30] Foreign Application Priority Data

Dec. 12, 1994 [DE] Germany .............................. 44 44 153

[51] Int. Cl.$^6$ ....................................................... H04J 3/12
[52] U.S. Cl. .............................................................. 370/524
[58] Field of Search .................................. 370/384, 385, 370/421, 464, 465, 467, 524; 379/207, 230

[56] References Cited

U.S. PATENT DOCUMENTS

| | | |
|---|---|---|
| 5,115,425 | 5/1992 | Ardon . |
| 5,182,750 | 1/1993 | Bales et al. .............................. 370/384 |
| 5,280,532 | 1/1994 | Shenoi et al. . |
| 5,323,398 | 6/1994 | Wake et al. . |
| 5,422,943 | 6/1995 | Cooney et al. .......................... 379/225 |
| 5,550,906 | 8/1996 | Chau et al. .............................. 379/207 |
| 5,818,921 | 10/1998 | Vander Meiden et al. ............. 379/225 |

FOREIGN PATENT DOCUMENTS

| | | |
|---|---|---|
| 05504757 | 9/1992 | European Pat. Off. . |
| 0570749 | 11/1993 | European Pat. Off. . |
| 4432458 | 3/1995 | Germany . |
| 4444153 | 10/1995 | Germany . |
| WO91/0390 | 3/1991 | WIPO . |
| WO92/21216 | 11/1992 | WIPO . |

OTHER PUBLICATIONS

Signals and Systems by Alan V. Oppenheim et al., London, Prentice–Hall International, Inc., 1983, pp. 543–555.

World Prosperity Through Communications, Boston, Jun. 11–14, 1989, vol. 3 of 3, Jun. 11, 1989. Vol. 3 of 3, Jun. 11, 1989, Institute of Electrical and Electronics Engineers, pp. 1149–1153, "Design and Deployment of an Integrated Data Ciphering Unit Inside A Low Bit Rate Voice Transcoder for Secure Voice Communications Over Telephone Networks" Malur K. Sundareshan.

(List continued on next page.)

*Primary Examiner*—Huy D. Vu
*Assistant Examiner*—Alexander Boakye
*Attorney, Agent, or Firm*—Jordan and Hamburg LLP

[57] ABSTRACT

The present invention relates to a method for the multiple access use of bit-transparent ISDN links by any subscribers and a device for carrying out the method. Normally in ISDN (Integrated Services Digital Network), a dial connection is established individually between subscribers, said connection carrying 64 kbps even over longdistances. That bit rate would be sufficient for the simultaneous transmission of several digitally coded voice signals. In local areas (LSA), devices such as ISDN private branch exchanges are connected to ISDN local exchanges for the purpose of carrying out the method. These devices form what is called an ISDN Link Sharing System (ILSS), reflecting their function. The ILSS elements are connected via bit-transparent dedicated lines which carry the basic traffic. For peak traffic, bit-transparent dial connections are established. All these bit-transparent links are used simultaneously for several links thanks to the use of signal processors to reduce the signal bit rate. Signalling which is also used for forwarding dialing data is exchanged between the ILSS devices, which capture charge data and carry out authorization checks. The ILSS devices can also be connected between different user networks and indirectly formed into a network via network nodes.

20 Claims, 4 Drawing Sheets

OTHER PUBLICATIONS

Globecom, 1985, Session 18, paper 3; vol. 2, Dec. 2, 1985, New Orleans, US, pp. 557–561, by S.S. Kanwal et al.

"Elektrisches Nachrichtenwesen", by J. Eldin and K.P. Lathia, vol. 64, (1990), No. 1, pp. 65–70.

"Rechtlicher Rahmen für„Corporate Networks" by Joachim Scherer, vol. 47, (1994), No. 11, pp. 786–791.

"Intelligente Private Telekommunikationsnetze" by Ludwig Richter, vol. 47, (1994) No. 11, pp. 782–785.

PUBLIC COMMUNICATIONS SERVICE WITH MULTIPLE ACCESS USE OF TRUNK LINKS

BACKGROUND OF THE INVENTION

The invention relates to a method for the multiple access use of bit-transparent dial connections and dedicated connections in the ISDN by any subscribers and to a device for carrying out the method. Normally, in the ISDN (Integrated Services Digital Network), a dial connection is established always individually between subscribers, said connection transmitting 64 kbps also over long distances, if the subscriber so signals. At the present time, there is no possibility in ISDN to utilize the bit rate of these bit-transparent dial connections or dedicated connections simultaneously for several mutually independent voice connections. The inventive method shall make low-cost long-distance calls possible for all subscribers over the existing network owing to the fact that a trunk link can be used simultaneously by several subscribers. This leads to a reduction in connection costs. In accordance with its function, the device for carrying out this method hereinafter is named ISDN Link Sharing System (ILSS). A telephone service with advantageous fees can be realized with this ILSS device.

Functions and services of the ISDN, as well as the interfaces to dedicated lines are known and largely fixed in international standards. Furthermore, the interfaces for digital trunk groups between telephone exchanges, such as the ISDN Primary Access (PA) and the ISDN No. 7 are known. Furthermore, there is also very efficient signaling over the network between subscribers and ISDN private branch exchanges. With that, it is also possible to build up virtual private networks. Several channels can also be combined to hyperchannels, the "bit sequence integrity" being maintained. At the present time, the ISDN network interfaces, available for private facilities, are the basic access (BA) and the PA.

Numerous methods and facilities for bit rate reduction for voice and data are known, including those with statistical multiplexes for utilizing voice pauses. It is irrelevant for the invention which of these methods is used for the aimed for service.

In the private utilization of the telephone service, it is already possible at the present time in some countries that, for trunk links between regions close to one another (Local Service Area=LSA), the subscriber number of a private long-distance operator is dialed. In some cases, these operators utilize devices, which also carry out voice compression on transmission paths. Devices for bit rate reduction are also used by network operators in long-distance networks. The possibility of multiple access use of dedicated lines by means of bit rate reduction is also known for connections between private branch exchanges.

There are numerous examples of the multiple access use of dedicated lines, even for the common transmission of voice and data: patent WO91/03901, patent EP 504757 A2, cl. H04Q-011/04. WO92/21216 is an example of the interlining of computers over the ISDN. Devices for the multiple access use of bit-transparent dedicated lines, the subscriber end points of which can be reached over switched lines from the PSTN, are also known (see, for example, ntz, volume 47 (1994), No. 11 page 791).

Furthermore, virtual private networks are realized over the ISDN and known (see "elektrisches Nachrichtenwesen", volume 64, (1990), number 1, pages 65 to 70 and "ntz", volume 47 (1994), number 11, pages 782 to 785. Subscribers, which are not subscribers of the virtual private network, can at the same time reach any long-distance subscriber.

Functions of the ISDN, used by the invention described below, are the sending of the calling subscriber number to the called subscriber (Calling Line Identification=CLI), user-specific signaling (service 1 according to ETSI) while the call is being set up and the subscriber-subscriber signaling s', all of which are transmitted in the D channel.

The possibilities of using the ISDN and digital voice compression also for dial connections between private branch exchanges is described in the Austrian patent AT 400,652 (AT30373/93). Dedicated lines between private branch exchanges, so equipped, are generally superfluous: In this last-mentioned patent application, the mode of operation of the signal converter for the bit rate reduction, for example, depends on the ISDN signaling of the remote subscriber.

With the known solutions, an independent operator of a telecommunication service cannot enable arbitrary subscribers to have multiple access use of ISDN switched lines and dedicated lines. These devices, for example, do not collect data for the billing of charges to individual subscribers and do not check the authorization. It is this in particular, however, which would be required in order to build up a cost-effective telephone service, which does not require its own trunk network. Furthermore, it is also not possible with the known solutions that arbitrary subscribers, over multiple access use of ISDN lines, can reach other subscribers directly over at a remote ISDN private branch exchange over a device for the multiple access use of bit-transparent connections, that is, without detouring over a remote ILSS device or over a local private branch exchange of a virtual private network.

SUMMARY OF THE INVENTION

The object of the invention is a method for the multiple access use of bit-transparent dial connections and dedicated connections (B) in the ISDN by several, mutually independent subscribers after a device (ILSS) for multiple access use of ISDN connections is dialed, especially for voice services over trunk connections, and a device for carrying out the method, so that there is no feedback on the ISDN. Furthermore, this ILSS device shall also alternatively work together with an 64 kbit/Sec. M(x) device of the AT30373/93 type for multiple access use of ISDN dial connections between private branch exchanges. The advantageous use of the ILSS device shall be open to all subscribers, in the local service area of which an ILSS device is connected to an ISDN exchange when the called subscriber also can be reached over a remote ILSS device. Moreover, the ILSS device, closest to the called subscriber, can be connected to an ISDN exchange in the remote local service area or inserted in the junction to the network of the new operator. Furthermore, dedicated lines between ILSS devices for the multiple access use of ISDN trunk links shall be used, insofar as their capacity is adequate.

In the text below, the following notations are used. "A", as first letter, denotes the calling subscriber or the local service area and the ILSS device, which the calling subscriber uses for outgoing calls, the letter "B" denotes the called subscriber or that particular local service area and ILSS device, over which the called subscriber is reached by incoming calls. Furthermore, a differentiation is made in the following description between a signal path (N) and a bit-transparent basic channel (B), the desired signal being transmitted with a significantly lower bit rate in the signal path (N) than in a bit-transparent connection.

The time-dependent fees for trunk links are to be lowered with the inventive ILSS device. The ability to reach all other subscribers over the ISDN or PSTN (Public Switched Telecommunication Network) shall remain unaffected. The operators of the long-distance network (LODIN=Long Distance ISDN) and of the local service area require only ISDN performance features in their systems.

Pursuant to the invention, this objective is accomplished owing to the fact that in at least two different local service areas (LSA) at least one ILSS device each is connected to at least one ISDN telephone exchange each, that the A-ILSS device receives additional signaling information from the calling subscriber (subscriber A), that the authorization of the subscriber is checked, that signals are exchanged between the A-ILSS and the B-ILSS devices, that a signal path (N) to the B-ILSS is made available, that the remote subscriber (B subscriber) is called over the B-ILSS device and, when the latter answers, a signal path (N) is established from subscriber A to subscriber B and maintained until the connection is disconnected, and that the desired signals in the LSS devices, transferred over the LODIN, before they are sent and after they are received, are passed over digital signal converters (TC), which are present for at least two signal paths (N), reduce the signal bit rate in the sending direction and reconstruct the original digital signal once again in the receiving direction, so that the bit-transparent basic channels (B) between the ILSS devices transport a number of signal paths (N) exceeding the number of the ILSS devices.

A first further development is characterized owing to the fact that the ILSS devices automatically set up bit-transparent dial connections among one another over the ISDN long-distance network (LODIN). In each case, the number of such connections is only as large as is required for the transmission of the respective cumulative bit rate on the switched and dedicated lines.

DETAILED DESCRIPTION OF THE DRAWINGS

Figure 1:
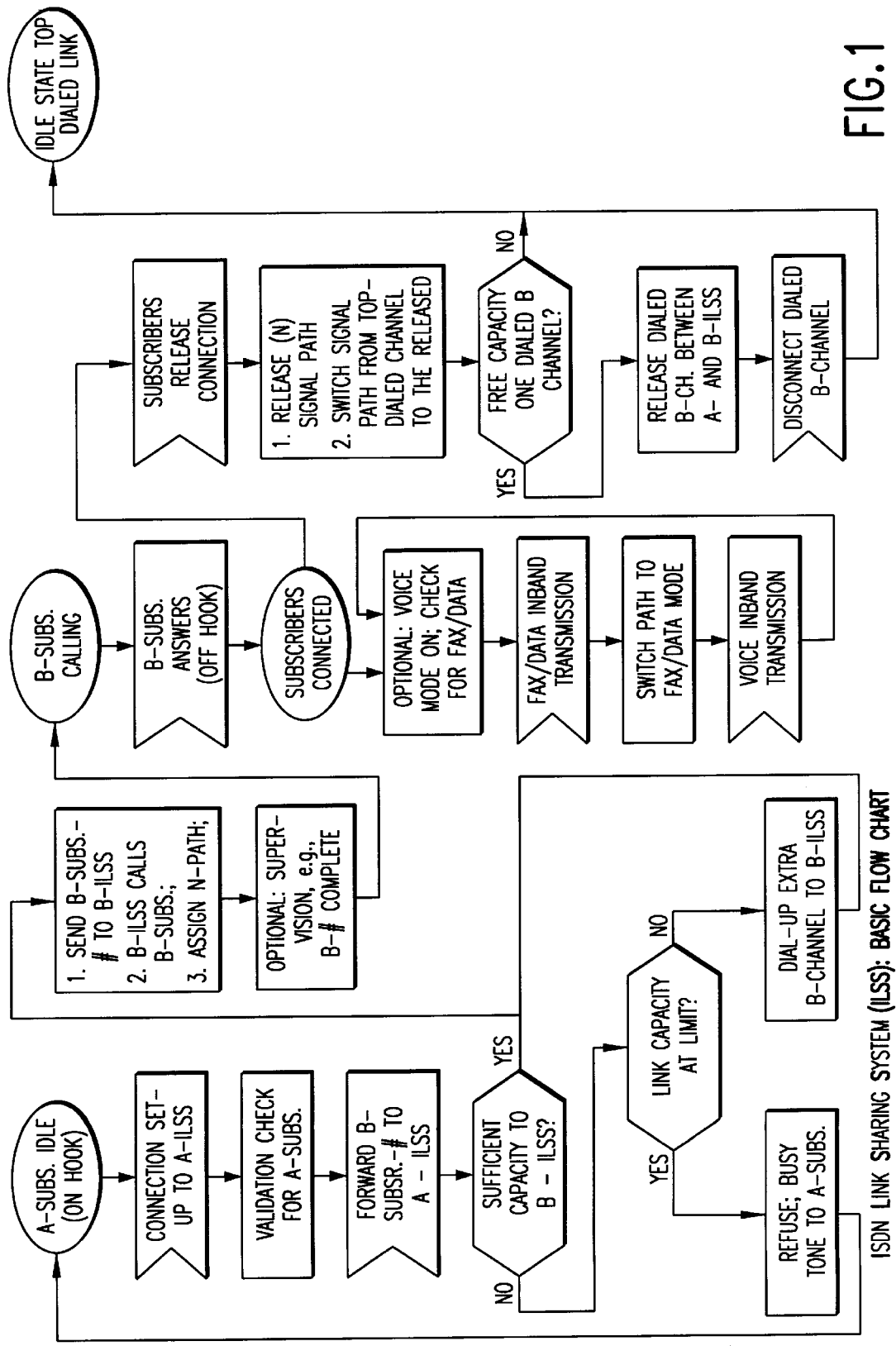

To accomplish the objective, inventive ILSS devices for multiple access use of bit-transparent ISDN connections are usually connected in several local service areas to an ISDN telephone exchange, these connection, in turn, being cross linked over the ISDN long-distance network (LODIN). The ILSS devices may also be connected over dial connections and dedicated connections with network junction servers, which connect voice-compressed signal paths (N). For the transition of the network from the traditional to the new operator, an ILSS device is introduced in at least one part of the interface. From this interface, a part of the connecting lines is connected with the network of the traditional operator and a different part of the connecting lines is connected with the network of the new operator. The basic course of the method of is shown in FIG. 1.

For the multiple access use of the bit-transparent connections, the ILSS device contains digital signal converters (TC=transcoders) for reducing the signal bit rate. The method can also be used by an ISDN private branch exchange (NStA), if the latter is expanded with the functional units required for this purpose or is connected over a function-compatible M(x) device, which is connected in series, to the ISDN.

Figure 2:
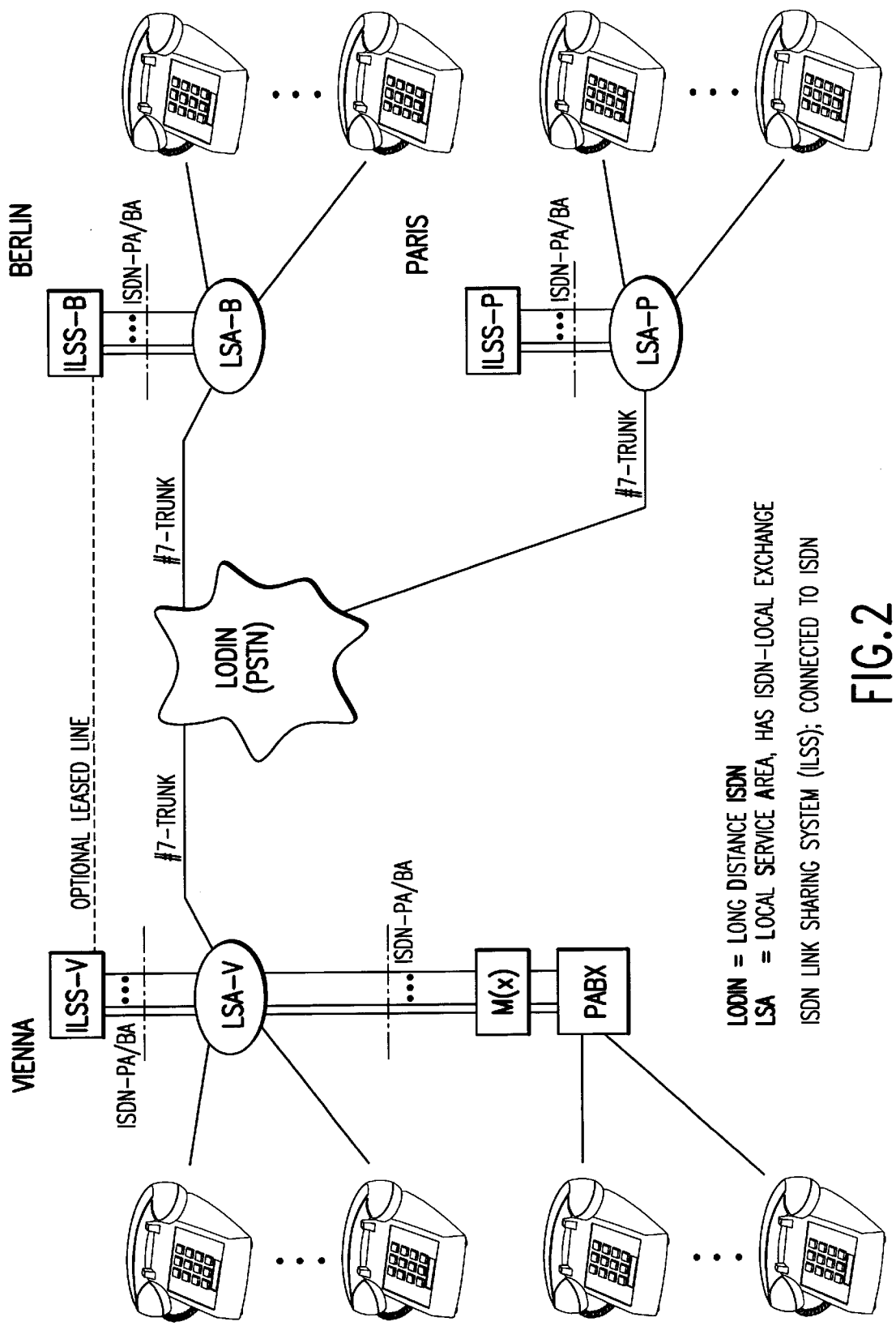

The ILSS devices are connected over ISDN interfaces, such as private branch exchanges (NSTA) with direct dialing to an ISDN local exchange (OVSt) in the respective local service area (LSA), as shown in FIG. 2. As ISDN connection, one or several ISDN BA or ISDN PA can be used. Furthermore, dedicated lines between ILSS devices are also possible. The number of BA, PA and dedicated lines arises out of the anticipated traffic and the division arises out of strictly economic considerations. The ILSS devices can also, like two private branch exchanges, be connected over two trunk groups with different private branch exchange call numbers to the ISDN telephone exchange. The first call number is made public for use by the subscriber in the local service area The second call number belongs to a "closed user group" for dial connections between ILSS devices and is set up in the ISDN. By these means, unauthorized persons are prevented from blocking the capacity of the inter-ILSS dial connection lines.

The ISDN local exchanges, to which the ILSS devices are connected, are themselves connected with one another or over connecting lines (trunk lines) with a Common Channel Signaling (CCS), suitable for ISDN. The use of the method also has no repercussions on a private long-distance network, since the build-up of bit-transparent connections per ISDN signal is forced. Alternatively, a private operator could also connect the ILSS device to a suitable interface of a long-distance exchange, for example, also between his local network and a different long-distance network.

So that the ILSS devices can also connect A and B subscribers, the latter see to it automatically that the dial connections are set up and then cleared once again. Whenever a connection is to be made, it is checked whether sub-channels, which could be used for a signal path (N) (see FIG. 1), are still free in the already existing bit-transparent basic channels. Usually one signal path (N) is used for a voice connection. A bit-transparent basic channel (Bp) advisably is divided up into fractional parts (b), so that a fractional part, for example 8, corresponds to a signal path (N).

There are several possibilities for signaling between ILSS devices. A first solution is to reserve-a fractional part b' of a basic channel, which was built up first, and to use this fractional part b' for a CCS between these devices. Unless it is conducted over a dedicated line, this basic channel is cleared only when the last desired signal path (N) between two ILSS devices is cleared. If the number of signal channels exceeds a value a, a further signaling channel (S) is also cleared together with the clearance of the next signal path (N) requested. A second possibility consists of the use of the user to user signaling s' of the ISDN or therein that the signaling in the D channel is transferred as p data The least delay time in the signaling is attained with the solution named first.

For the digital signal converter (TC) mentioned further above, different operating modes are used depending on the nurture of the desired signal or on the special signaling by the subscriber. In this connection, the main objective always is to reduce the bit rate of the desired signal.

A first operating mode of this digital signal converter is that of a transcoder (TC), the digitized voice being compressed on a fractional b, so that several signal paths (N), which in each case use only a fractional part b of a bit-transparent connection (B), are transferred simultaneously over this connection (B).

A second mode of operation of this digital signal converter is that of a FAX/data modem. The FAX/data signals, converted into digital signals, are transferred in a fractional part b of a bit-transparent connection (B), from which, in the receiving direction, digitized analog signals for receipt by the remote FAX/data modem are produced. In a further development, the digital signal converter can in this case be expanded to the function of a FAX server, which partially stores the FAX data on an interim basis.

At the starting point of the method of FIG. 1, the A-ILSS device is called by the A subscriber. Pursuant to the invention, two possibilities are provided for checking the use authorization of the A subscriber. The use authorization need be checked only for the outgoing calls, that is, for subscriber A, in order to ensure that costs can be assigned unambiguously.

In a first method, the use authorization is checked automatically by the ILSS device. In this case, it is assumed that the A subscriber uses a local exchange, which has the performance characteristic "CLI". With the call from the ISDN, the ILSS device also receives the CLI of the subscriber A, which characterizes the connection of the subscriber unambiguously. In a first type of automatic checking, any subscriber, who is not blacklisted, is entitled a priori to use the system. In a second type of automatic checking, a subscriber is entitled to use the system, only if the CLI, which characterizes his connection, is entered in the subscriber data record. The first-named type admittedly has the advantage that, for the subscriber, the threshold for use is small; however, it requires that the invoice address, belonging to the CLI, can be ascertained subsequently.

A second method is the semi-automatic checking of the authorization to use by the ILSS device. In this case, the CLI of the calling subscriber is unavailable, for example, because the subscriber is connected to a local exchange, which uses the old technique. In this case, the A subscriber must identify himself to the ILSS device by code numbers. For this purpose, several sub-variations, known from other applications, are possible. In one variation, the ILSS device also contains a DTMF Code Receiver (receiver for touch tones). By the absence of a complete CLI, the ILSS device recognizes that the semi-automatic checking of the authority to be used must be started. In this state, the device awaits the receipt of the corresponding code numbers. In addition, in the waiting state, the ILSS device can request the user by announcements or suitable audible tones to input the missing parts of the code numbers and, if the entry is not correct, to repeat the input. An advantage of this technique, consists therein that the ulcer is not tied to a particular telephone connection.

After a positive result has been obtained from the examination of the authorization to use, further additional signaling information of the A subscriber is recorded and processed by the A-ILSS device. This additional signaling information is recorded, for example, in the same way as an ISDN private branch exchange records direct dialing information, which the network generates from the dialing information coming from the subscriber. In a second type, the direct dialing information is recorded in the same way as this information is transferred from the calling device. The manner of recording direct dialing information is fixed in the configurational data. The second type is used, for example, when the B subscriber is called from a private branch exchange, which is connected over an M(x) device for the multiple access use of bit-transparent connections to the ISDN. In cases, of automatic checking, these processes take place almost simultaneously.

The B-ILSS, to which a new signal path (N) is to be produced, is ascertained from a first part of the direct dialing information. Pursuant to the invention, the ILSS device checks each direct dialing number received to establish whether this direct dialing number also characterizes a remote ILSS device. If an invalid direct dialing number is selected by the A subscriber, then this is signaled by the A-ILSS by means of a tone such as "wrong selection". Furthermore, it is checked whether the ILSS device still has sufficient capacity to produce a further signal path to the B-ILSS. In this connection, it may happen that the total basic channel capacity of the ILSS device is already exhausted and that all signal paths (N) to the desired B local service area (LSA) are also busy. In this case, the A subscriber receives a busy signal. In the usual case however, capacity is available.

The ILSS device also checks whether sufficient basic channels to the BILSS have already been set up. In the event of a positive answer, it assigns a free signal path (N) to the new connection request. In the event of a negative answer, the A-ILSS device selects a new bit-transparent connection to the B-ILSS for the new signal path. In a special embodiment, this selection is delayed, for example, until the B subscriber is called. Furthermore, the A-ILSS device checks whether, in this case, the signaling capacity to the B-ILSS must also be increased and, when necessary, reserves a further fractional part b' of the new basic channel (B). The sequence of processes described here can also be modified.

Furthermore, on the basis of the direct dialing information received, the A-ILSS signals the B-ILSS which subscriber in the B local service area is to be called. For example, this can be done by transferring the calling number, under which the B subscriber can be reached in the local network of B-ILSS. In addition, the area code of the subscriber called is also signaled to the B-ILSS. The B-ILSS discards this if it is identical with that of its own local network. This has the advantage that neighboring local networks, for which the same local area tariff applies, do not require their own ILSS device.

With the number of the B subscriber received, the B-ILSS automatically then dials the B subscriber. However, busy cases may occur. In such a case, the A-ILSS receives a busy tone or also an appropriate signal from the B local service area. Thereupon, the A-ILSS sends busy tones to the A subscriber.

As mentioned further above, digital signal converters are provided for different conversion functions. Pursuant to the invention, the digital signal converters contain at least two conversion programs and one signal type identifying program. The first conversion program is that of a transcoder for voice, the second that of a fax-data modem. In the "voice" operating state, the signal type identifying program monitors whether the subscribers desire fax or data operation. If the appropriate tones are detected and, at the same time, any voice is absent, the digital signal converters switch over into the "FAX" operating state. In this operating state, the signal type identifying program of the digital signal converters recognizes when voice is transmitted once again in the signal path instead of data or a FAX. If this is the case, the digital signal converters are switched over once again to the "voice" operating type.

If a connection is disconnected, the ILSS devices, pursuant to the invention, immediately check whether a basic channel B can be cleared in the trunk network LODIN. This is the case when the summation bit rate of all signal paths (N) and all signaling paths (S) leading over basic channels are smaller, by at least the bit rate of a basic channel, than those, which are available over all existing basic channels, including those of dedicated lines, which may be available.

Figure 4:
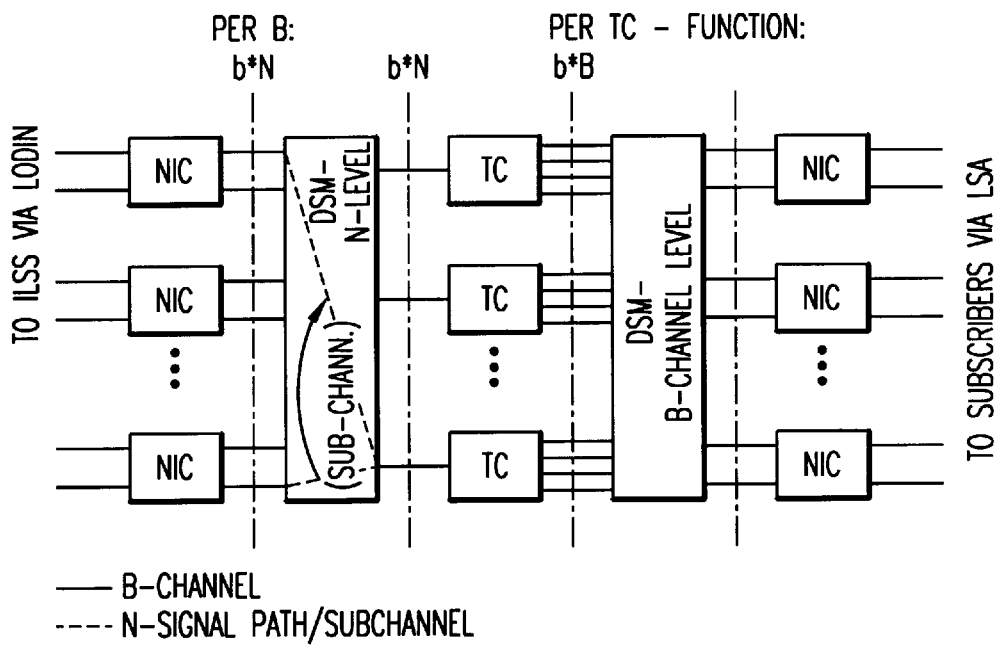
Figure 5:
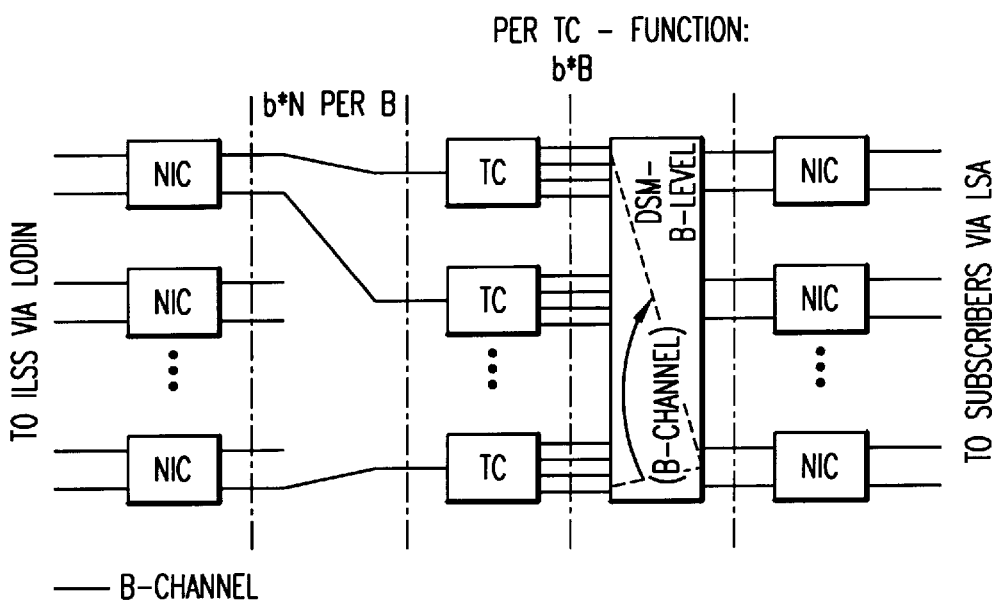

If a dial connection, which is to be released, was determined, it can be released only when desired signals are no longer transferred over it. For this purpose, the desired signals of this dial connection are switched over to the free capacity of the remaining connections. Moreover, each ILSS device switches the desired signal first in the sending direction to the free signal path (N) and signals this to the respective other ILSS device. If the latter receives the signal to switch over, the receipt of the desired signal is switched over immediately to the newly occupied signal path (N). In the ILSS device, the switching over can take place in the PCM plane, where the desired signal is coded with 64 kbps, or in the signal path plane to sub-bit rates of 64 kbps. The corresponding signal paths are shown in FIGS. 4 and 5. At the same time, a crackling noise arises, which depends on the type of coding and of the down time of the desired signal path due to the switching-process. Noise-reduction measures are known and possible.

The ILSS device contains a system processor (SP) for controlling the . . . of the method and for the operation. This system processor contains a series of configurational data, which consists of several data sets. For the method, the SP holds information required for checking authorization in a first data set and the basic fee data accruing for each individual subscriber in a further data set. The subscriber data set can be put in from a control computer. The latter could also take over the subsequent processing for preparing invoices.

In a further data set, the system processor contains the network data. The latter contains information which, on the one hand, assigns the local code numbers to the local service areas and the call numbers of all remove ILSS devices, with which there is to be collaboration.

The objective, that an ELSS device also works together with a remote M(x) device for the multiple access use of bit-transparent dial connections between private branch exchanges, as described in the Austrian patent application AT30373/93, is accomplished pursuant to the invention owing to the fact that the ILSS device contains configurations, which unambiguously characterize the authorized M(x) device, that the ILSS device, when first dialed up from an M(x) device, structures the basic channels in the same way into signal paths (N) and signaling sub-channels, as does the calling M(x) device, that the ILSS device adjusts digital signal converters (TC) and inserts them at least into used signal paths in the same way as does the M(x) device and that the ILSS device takes up direct dialing information from the M(x) device and, on the basis of this, establishes a connection to the called subscriber.

This procedure is advantageous for the operator of the PABX with the M(x) device if it happens more frequently that several calls are being conducted simultaneously with partners in the remove local service area.

Figure 3:
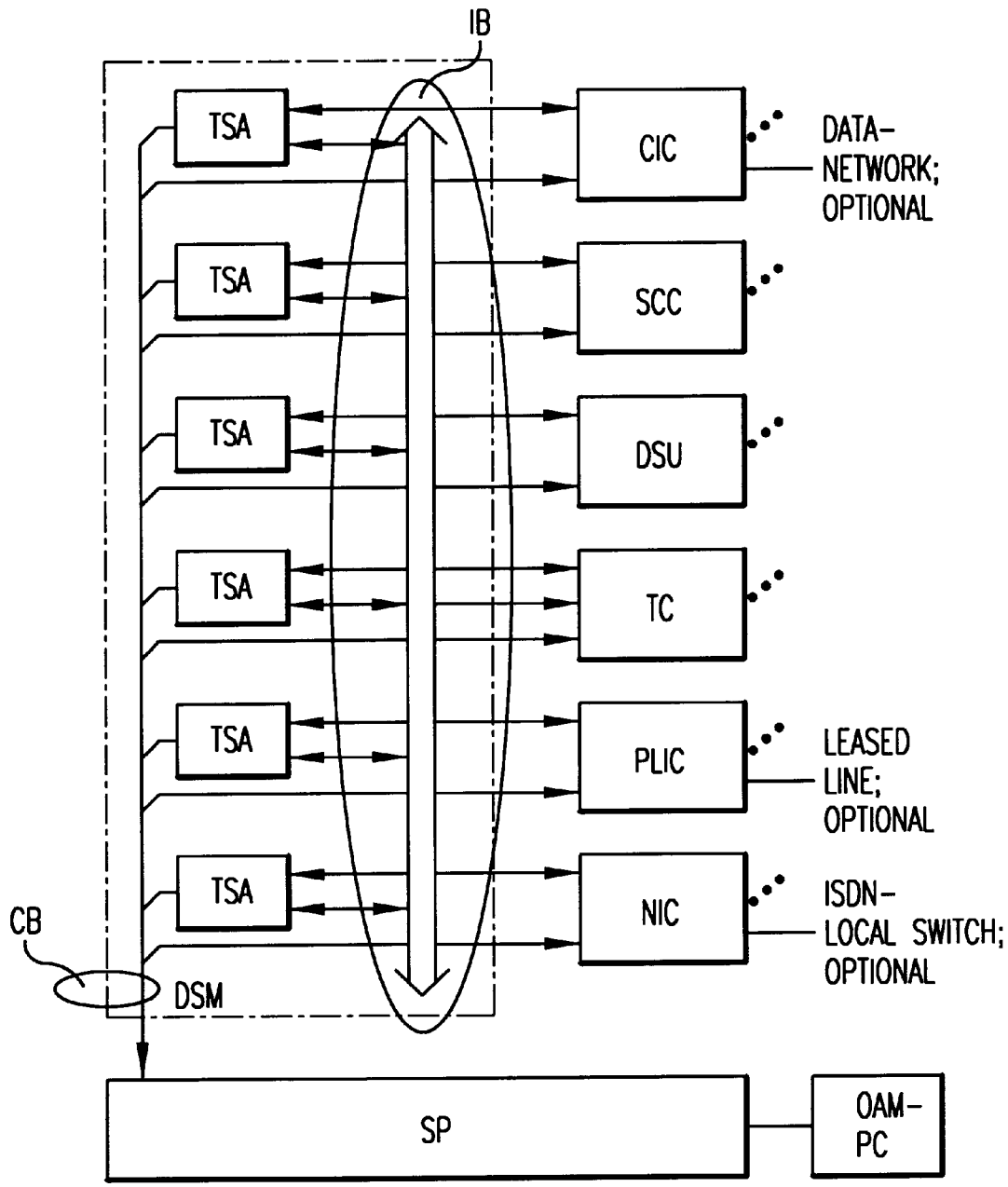

The inventive device for carrying out the method is described in the following. Pursuant to the invention, an ILSS device for carrying out the method is formed owing to the fact that the ILSS device contains at least one system processor (SP), digital signal converters (TC) for at least two signal paths, at least one digital, switching network function (DSM=Digital Switching Network) and, at the exchange, an ISDN interface circuit (NIC) for at least three basic channels (B), that the aforementioned functional units are connected to one another over at least one informational line system (IB) and, over at least one control circuit system (CB), with the system processor (SP) and that the system processor (SP) contains a data memory and a program memory, in which the programs and data, required for implementing the method and for controlling the interface circuits, are stored (FIG. 3).

In a first further development of the inventive ILSS device, the digital switching network (DSM) is constructed in such a manner, that sub-channels can be switched individually (FIG. 4). The simplest type of sub-channel is formed by assigning to each bit of an octet, which normally represents a bit-transparent transmitted "PCM word", its own switchable sub-channel. With that, transcoded desired signals can be multiplexed and demultiplexed optionally into bit-transparent connections B.

The Sub-channel Communications Controller (SCC) serves for signaling between the ILSS devices. An SCC can be assigned over the DSM to each fractional part b' of a basic channel B, which is used for CCS between these ILSS devices. The number of SCC used is at least as large as the number of targets, with which there are multiple access used bit-transparent connections (B) simultaneously.

In a third further development of the inventive ILSS device, the latter contains a Digital Service Unit (DSU) for receiving dial tone and line signals and for sending audible tones and announcements. This DSU is also connected over the information line system (IB) with the digital DSM switching network and over the control circuit (CB) with the system processor.

In a fourth further development of the inventive ILSS device, the latter contains at least one PLIC (Permanent Line Interface Circuit) for at least one digital dedicated connection line. This PLIC serves for connecting the ILSS device to a private or rented line of the operator. This PLIC contains at least one interface for 64 kbps or also one interface for 2 Mbps according to CCITT G.703.

In an alternative construction of the inventive ILSS device, the interface circuits (NIC), leading into trunk connections, are permanently assigned to certain digital signal converters (TC) (FIG. 5). This can be accomplished, for example, by way of separate lines.

At least one informational line system (IB) and at least one control circuit system at all time serve to link the functional units. In one known construction, the transmission is structured over the IB in time slots, at least one time slot being assigned to the CB for control tasks. This is referred to as the "embedded control channel".

In a first embodiment, the aforementioned functional units are accommodated in a suitable manner in assemblies, which are mounted and wired in an assembly carrier.

In a second embodiment, the aforementioned functional units are integrated in a suitable manner in a private branch exchange. For this purpose, the control computer of the private branch exchange functions as the system processor (SP). Existing interface assemblies (NIC) are used for connecting to the ISDN and existing solutions are used for the DSU. For carrying out the method with digital signal converters (TC) and when necessary, this private branch exchange is upgraded with a suitable switching network and SCC for switching sub-channels. The systems software is modified in such a manner that the previously described inventive method is carried out in addition to the tasks of the private branch exchange.

In a third embodiment of the device, a personal computer or a work station (PC) is used as system processor. Suitable ISDN interface assemblies, which are plugged into the PC, are available for these work station systems. The computer BUS is so efficient, that a separate switching network (DSM) is not required. Instead, all assemblies, which are required for the ILSS device, contain an interface circuit for the BUS, which enables individual basic channels and signal paths to be switched between these assemblies. Moreover, one or several assemblies with digital signal converters (TC) and, if necessary, SCC, are plugged into this PC.

The realization of the individual functional blocks, as such, is known. The system processor (SP) contains one or several microprocessors (MP), program and data memories (ROM and RAM), optionally a controller for Direct Memory Access (DMA) and control components for the control BUS (CB), as well as at least one communications interface, such as a V.24, for connecting to an external PC for operating and maintenance functions. Preferably, digital signal processors (DSP) are used for the digital signal converter, one or more TC functions being implemented in a DSP. As described further above, these DSP are programmed corresponding to the transfer function required.

The DSM function can be realized in different ways. In a first type of realization, the digital switching network is realized as a concentrated function. For this purpose, one or more ASIC and/or digital switching network components are used. A special form of the construction enables subchannels to be switched. In a second type of realization, the DSM function is realized in a distributed fashion, as indicated in FIG. 3. For this purpose, the information line system (IB) is structured in time slots and the function of the DSM is distributed among the functional units TC, NIC, DSU and SCC. On this IB, each of these modules then contains an access circuit labeled with TSA (time slot assignment). Switching is carried out here by assigning, by means of the system processor, one sending and receiving time slot for at least one line of the IB.

For the NIC functional block, special, highly integrated circuits are available from welt-known manufacturers. In order to keep the dynamic load small for the SP, preferably those circuits are used which process layer 1 and layer 2 of the signaling protocol largely automatically. The same is true for the communications controller component, which is used as SCC. If necessary, especially for larger systems, regional processors and components for internal interfaces can also additionally be used for several functional units.

The Network Termination NT on the subscribers side is not shown in FIGS. 2 and 3. Depending on regulations, the NT can be a component of the ILSS device or a connection installed by the network operator at the subscriber.

On the network plane, the ILSS devices also fulfill other functions, particularly for the operation and maintenance. If a network is extended by the installation of further ILSS devices, configurational data must be copied in all already installed devices. For this purpose, a PC is connected to the ISDN for operation, administration and maintenance (OAM PC). Each ILSS device has reserved certain direct dialing information in a "Closed User Group" for this OAM PC; this information makes access to the SP system processor possible.

The advantages of the inventive ILSS device and of the operating method fixed in the control program consists of a lowering of the fees, which accrue for trunk calls for a given traffic volume. This lowering of fees can be used by operators of ILSS devices for realizing a public telephone service, which can be used by anyone. With the coverage of the peak load by dial connections, it is possible to save on dedicated lines. Due to the compatibility with an M(x) device for the multiple access use of bittransparent connections between private branch exchanges, companies and authorities can achieve greater fee reductions if they maintain these extensive voice connections with customers in remote regions.

I claim:

1. A method for the multiple access of bit-transparent connections (B) in the service-integrated digital network (=ISDN) by several mutually independent subscribers by means of multiple access connecting devices (ILSS), characterized in that in at least two different local service areas (LSA), at least one device for multiple access connection (=ILSS device) each is connected to at least one ISDN telephone exchange each, that the ILSS device (A-ILSS), called by the calling subscriber (subscriber A), receives additional signaling information, that the authorization of the calling subscriber is checked, that signaling is exchanged between this aforementioned device (A-ILSS) and the ILSS device (B-ILSS), close to the called subscriber (B subscriber), that a signal path (N) to the remote ILSS device (B-ILSS) is made available, that the remote called subscriber (B subscriber) is called over the ILSS device (B-ILSS) close to him and, when the latter answers, a signal path (N) is established from the calling subscriber (subscriber A) to the called subscriber (subscriber B) and maintained until the connection is disconnected, and that the desired signals in the ILSS devices (ILSS), transmitted over the ISDN long-distance network (LODIN), before they are sent and after they are received, are passed over digital signal converters (TC), which are present for at least two signal paths (N), reduce the signal bit rate in the sending direction and reconstruct the original digital signal once again in the receiving direction, so that the bit-transparent 64 kbit/sec basic channels (B) between the devices (ILSS) can transport a number of signal paths (N) exceeding the number of the ILSS devices.

2. The method of claim 1, characterized in that the multiple access connecting ILSS devices automatically set up, maintain and clear bit-transparent dial connections among one another over the ISDN long-distance network (LODIN), the number of which dial connections in each case is only as large as is required for the transmission of the respective cumulative bit rate on the switched and dedicated lines.

3. The method of claim 1, characterized in that the additional signaling information coming from the A subscriber, is taken up by the called ILSS device in the same manner as the direct dialing information is taken up by an ISDN private branch exchange.

4. The method of claim 1, characterized in that the additional signaling information of the calling subscriber is taken up in the same manner as it is transferred over the local service area from an M(x) calling device for the multiple use of ISDN dial connections between private branch exchanges and that the manner, in which this additional signaling information is taken up, is fixed in the configurational data.

5. The method of claim 1, characterized in that the mode of functioning of the digital converters (TC) can be switched between at least two types of operation, that a first mode of operation is that of a transcoder for voice, that a second mode of operation is that of a FAX/data modem, that the digital signal converters (TC) contain a signal-type recognition function which, in the "voice" state of operation, monitors whether the subscriber wants FAX or data operation and, in the FAX/data state of operation, monitors whether the subscriber wants voice operation, that the signal type identified is signaled to the respectively other digital signal converter and that finally the mode of functioning of the digital signal converter is adjusted depending on the nature of the desired signal.

6. The method of claim 1, wherein the ILSS device contains at least one system processor (SP), digital signal converters (TC) for at least two signal paths, at least one digital switching network function (DSM=Digital Switching Matrix) and, at the exchange, an ISDN interface circuit (NIC) for at least three basic channels (B), that the aforementioned functional units are connected over at least one informational line system (IB) with one another and over at least one control line system (CB) with the system processor (SP) and that the system processor (SP) contains a data memory and a program memory, in which the programs and data, required for carrying out the method and for controlling the interface circuits, are stored.

7. The method of claim 1, wherein the ILSS device is realized on the basis of an ISDN private branch exchange, at least one system processor (SP) of this ISDN private branch exchange containing a program memory and a data memory, in which programs and data are fixed, which are required for carrying out the method, and that this ISDN private branch exchange is equipped with at least two digital signal converters (TC), which are connected with the switching network of the ISDN private branch exchange and with the network interface circuits (NIC) of the ISDN private branch exchange over at least one information line system (IB).

8. The method of claim 1, wherein the ILSS device is realized on the basis of an office computer (PC), the latter serving as a system processor (SP) and containing a memory, in which the programs and data, required for implementing the method, are fixed and that this computer (PC) is equipped with digital signal converters (TC) for at least two signal paths and with ISDN interface circuits (NIC) for at least three basic channels (B), that at least one digital switching network function (DSM=Digital Switching Matrix) is present, over which the digital signal converter and the ISDN interface circuits (NIC) are connected over at least one information line system (IB) and that, finally, over a control line system (CB), the computer controls these functional units in accordance with the method.

9. The method of claim 1, characterized in that, no later than when a first signal path (N) is set up between two ILSS devices (A/B-ILSS), at least one semi-permanent signaling channel (S) is set up, in that the further signaling between these ILSS devices takes place over this signaling channel (S) and in that finally, after the last signal path (N) between these ILSS devices (A/B-ILSS) is cleared, the signaling channel (S) is cleared if a dial connection with time-dependent fees can be cleared by these means.

10. The method of claim 1, characterized in that, for checking the authorization, the called ILSS device (A-ILSS), with the call from the ISDN, also receives an identification (CLI) of the calling subscriber (A subscriber) and that such a subscriber is a priori authorized to use, if the connection of this subscriber A is clearly characterized by the receiving identification (CLI) and is not entered in a blacklist.

11. The method of claim 1, characterized in that, for checking the authorization, the called ILSS device (A-ILSS), by the absence of a complete identification of-the calling subscriber (CLI), recognizes that a semi-automatic checking of the authorization to use must be started, that this semi-automatic checking, for checking the authorization to use of the calling subscriber (A subscriber) requests that identification be provided by code numbers to the called ILSS device (A-ILSS) and that finally, the authorization to use is concluded positively, when the subscriber has identified himself unambiguously and his code numbers are not entered in the blacklist.

12. The method of claim 1, characterized in that, for signaling between the ILSS devices (A/B-ILSS), at least one defined fractional part (b') of at least one 64 kbit/sec basic channel is used as semi-permanent signaling channel (S) and the transmission capacity, which is reduced by this bit rate and made available by dedicated and dialed connections, remains for the signal paths (N).

13. The method of claim 1, characterized in that, for at least one signal path (N), a fractional part b of at least one bit-transparent dedicated line between two ILSS devices (A/B-ILSS) is used, that this is always used with priority over signal paths (N) made available by dedicated lines and, that, the number of active dial connections, which are additionally required for the transmission of the respective of the summation bit rate of all signal paths (N) and signaling channels (S) is reduced therewith.

14. The method of claim 1, characterized in that the digital signal converters (TC), in the sending direction to the ISDN long distance network (LODIN), compress the digitized voice signal by a transcoding to a fractional part (b) of the original bit rate and, in the receiving direction, carry out a reconstruction into the original coding.

15. The method of claim 1, characterized in that the digital signal converters (TC), in the sending direction to the ISDN long distance network (LODIN), convert pulse-code modulated (PCM) FAX/data modem signals, coming from the subscriber, into digital signals, sends these in a fractional part (b) of a 64 kbit/sec basic channel and, in the receiving direction, carry out once again a reconstruction into the original PCM-signal representation.

16. The method of claim 1, characterized in that the ILSS devices (A/B-ILSS) have available two trunk groups for dial connections, that a first trunk group serves for dial connections between the aforementioned devices (A/B-ILSS) and is connected to an ISDN telephone exchange of a first operator and that a second trunk connection serves for dial connections to calling/called subscribers (A/B subscribers) and is connected to the ISDN telephone exchange of a second operator.

17. The method of claim 1, characterized in that the ILSS device (A/B-ILSS), for working together with at least one device for the multiple access use of bit-transparent connections between private branch exchanges (M(x)), contains configurational data, which unambiguously characterizes the authorized M(x) devices, that the called ILSS device (A-ILSS), when first called from a device for the multiple access of bit-transparent connections between private branch exchanges (M(x)), structures the multiple access used 64 kbit/sec basic channel in the same way into signal paths (N) and signaling channels (S), as does the calling, aforementioned M(x) device, that the called ILSS device (A-ILSS) checks the authorization to use of the calling M(x) device and sets the digital converters (TC) in the same way and inserts them at least into the used signal paths (N), as does the aforementioned M(x) device and that the ILSS device (A./B-ILSS) and the devices for the multiple access use of bit-transparent connections between private branch exchanges (M(x)) exchange signals and, on the basis of these, established connections between the calling subscriber and the called subscriber.

18. The method of one of the claims 6 to 8, wherein at least one digital switching network (DSM) is constructed in the ILSS device for the optional switching of sub-channels in such a manner, that the sub-channels can be switched individually and that at least one sub-channel is assigned to a signal path, the bit sequence integrity being assured when more than one sub-channel is used for a signal path.

19. The method of one the claims 6 to 8, wherein the ILSS device contains at least one interface circuit (PLIC=Private Line Interface Circuit) for at least one private, digital connecting line and that this PLIC is also connected over the information line system (IB) with the digital switching network function (DSM) and, over the control line system (CB), with the system processor (SP).

20. The method of one of the claims 6 to 8, wherein the ILSS device (ILSS), for receiving touch tone signals and line signals and for sending audible tones and announcements, contains a Digital Service Unit (DSU) which recognizes these signals in digitally modulated coding and generates these tones and announcements in digitally modulated coding, that this DSU is also connected over the informational line system (IB) with the digital switching function (DSM) and, over the control line system (CB), with the system processor (SP).

* * * * *